United States Patent [19]
Ekstrom et al.

[11] 3,835,365
[45] Sept. 10, 1974

[54] CONTROL EQUIPMENT FOR AN ELECTRONIC POWER CONVERTOR

[75] Inventors: Ake Ekstrom; Per Olof Jackson; Lenhart Jansson, all of Ludvika, Sweden

[73] Assignee: Allmanna Svenska Elektriska Aktiebolaget, Vasteras, Sweden

[22] Filed: Nov. 21, 1973

[21] Appl. No.: 418,112

[30] Foreign Application Priority Data
Dec. 11, 1972 Sweden............................ 16112/72

[52] U.S. Cl. .................................... 321/11, 321/13
[51] Int. Cl...... H02h 7/14, H02m 1/18, H02m 1/08
[58] Field of Search .............................. 321/11–14, 321/38, 40, 42; 315/252

[56] References Cited
UNITED STATES PATENTS
| | | | |
|---|---|---|---|
| 3,609,508 | 9/1971 | Gusakovsky et al. | 321/11 |
| 3,622,862 | 11/1971 | Boksjo | 321/11 |
| 3,636,431 | 1/1972 | Machida et al. | 321/11 |

OTHER PUBLICATIONS
IEE Conference on HVDC Transmission, Morales, "Sequential Operation of HVDC Convertors Without By–Pass Valves," pp. 207-210, Sept. 1966.

Primary Examiner—William H. Beha, Jr.

[57] ABSTRACT

An electronic power convertor which has a plurality of rectifiers arranged in a bridge connection is provided with a pulse generator and with connecting members in the circuit between the pulse generator and the rectifiers. Connecting members in the connection between the pulse generator and the rectifiers are controlled by control circuits which, in response to a blocking signal, render the connecting members inoperative, so that control voltage is no longer supplied to the rectifier from the pulse generator directly through the connecting members. However, the control circuit also acts to continue the supply of control voltage to one of the rectifiers which are conducting at the time that the blocking signal is initiated and to the corresponding rectifier of the same phase of the bridge, so that these two rectifiers will conduct and form a bypass circuit. In case of deblocking of the rectifier, each commutation group of the bridge is deblocked separately by the normal control pulse for the proper rectifier of the group acting in the by-pass circuit.

4 Claims, 3 Drawing Figures

CONTROL EQUIPMENT FOR AN ELECTRONIC POWER CONVERTOR

BACKGROUND OF THE INVENTION

1. Field of the Invention

The present invention relates to control equipment for an electronic power convertor with rectifiers in a multi-phase bridge connection, in which the rectifiers in each half of the bridge connection form a commutation group and in which two rectifiers belonging to one phase of the bridge connection form a by-pass path in case of a blocking of the convertor. Control equipment of this kind comprises, among other things, a control pulse generator having outputs for the different rectifiers in the bridge connection. More specifically the invention relates to devices for connection and disconnection of working rectifiers as well as by-pass rectifiers in connection with blocking and deblocking of the convertor.

2. Description of the Prior Art

In the operation of a convertor connected to a d.c. power line for high-voltage power transmission, the occurrence of disturbances must be taken into consideration, for example external faults in the form of short-circuits, earth faults or overvoltages on d.c. or a.c. lines, or internal faults arising in the proper convertor. Such disturbances are normally dealt with by blocking the convertor, after which it may be reconnected again. Such blocking is accomplished by disconnecting the control pulses of the control pulse generator from the rectifiers and by forming a by-pass path. In convertors with ion rectifiers such a by-pass path is normally formed of a special by-pass rectifier, and in convertors with thyristor rectifiers the by-pass path is formed of two rectifiers forming part of one phase in the rectifier bridge so that no special by-pass rectifier is required.

SUMMARY OF THE INVENTION

As mentioned, the invention relates to devices for connection and disconnection of rectifiers in normal operation as well as the rectifiers working as by-pass rectifiers. The invention is based on the general principle that the control pulse generator continues to work independently of any blocking and is only disconnected from the rectifiers.

According to the invention, deblocking of the convertor is achieved by deblocking each commutation group separately, so that the control pulse generator is connected to each commutation group by way of special connection members which are disconnected in the case of blocking and reconnected in the case of deblocking, and this reconnection is made for each group in dependence of the control pulse to the rectifier in the group which is working as a by-pass rectifier. A further development of the invention relates to the choice of by-pass rectifiers in case of blocking of the convertor, in which case in one of the commutation groups blocking signals are supplied as control orders to a first rectifier which is conducting at the moment of blocking and to a second rectifier in the second group which lies in the same bridge phase as the first one. This choice is made, according to the invention, with substantially the same circuits as are used in case of deblocking.

According to the invention, an electronic power convertor is composed of pairs of rectifiers connected in a bridge connection, and supplied with control pulses from a control pulse generator. Connecting members are provided in the lines between the control pulse generator and the rectifiers. There are also control circuits, which, when a blocking signal is supplied, render the connecting member inoperative, and thus eliminate the direct connection between the control pulse generator and the rectifiers. At the same time, however, a connection is made through the control circuit from the control pulse generator to a pair of rectifiers, one of which is conducting at the time the blocking signal is initiated, so that these two rectifiers continue to conduct and constitute a by-pass path.

The control circuit includes And-gates which provide a signal in response to the simultaneous presence of a pulse from a pulse generator and the blocking signal, and Or-gates between the control circuits and the connecting members and the rectifiers.

BRIEF DESCRIPTION OF THE DRAWINGS

The control equipment according to the invention will be described more closely with reference to the accompanying drawings, in which.

DESCRIPTION OF THE PREFERRED EMBODIMENTS

Figure 1:
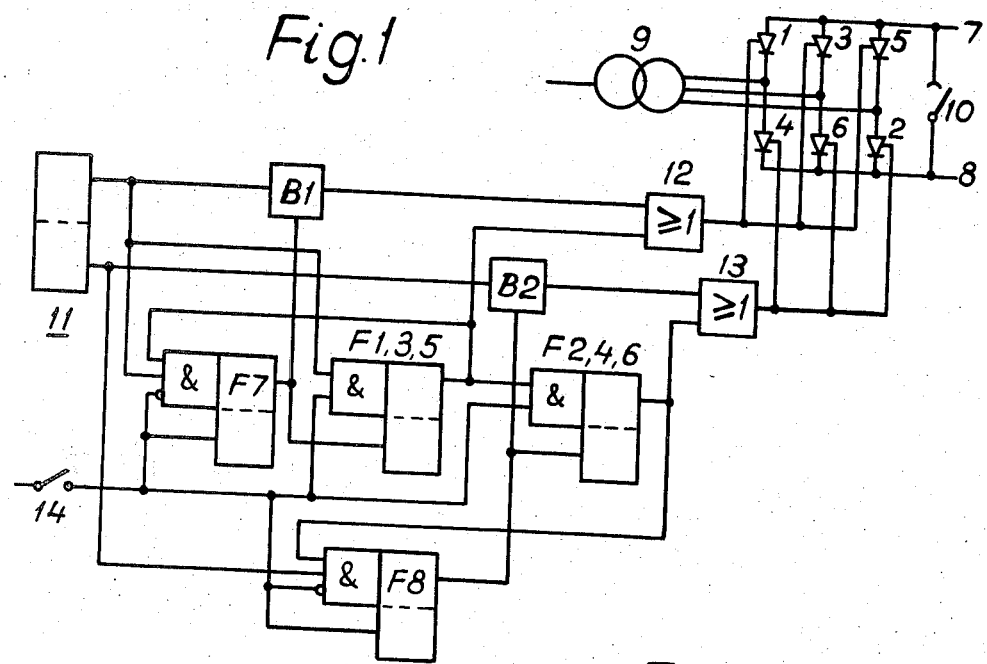
FIG. 1 shows an electronic power convertor with a diagram of control equipment according to the invention.

FIG. 1 shows a convertor comprising a three-phase bridge connection with rectifiers 1 to 6 intended to commutate in the given sequence, thus forming two commutation groups 1, 3, 5 and 2, 4, 6. The rectifier bridge is connected, on the one hand, to d.c. bars 7,8 and on the other hand, to a convertor transformer 9 which is connected to an a.c. network (not shown). Further, a by-pass switch 10 is arranged in parallel with the rectifier bridge, and said switch 10 may be an isolator as shown or a breaker.

Figure 3:
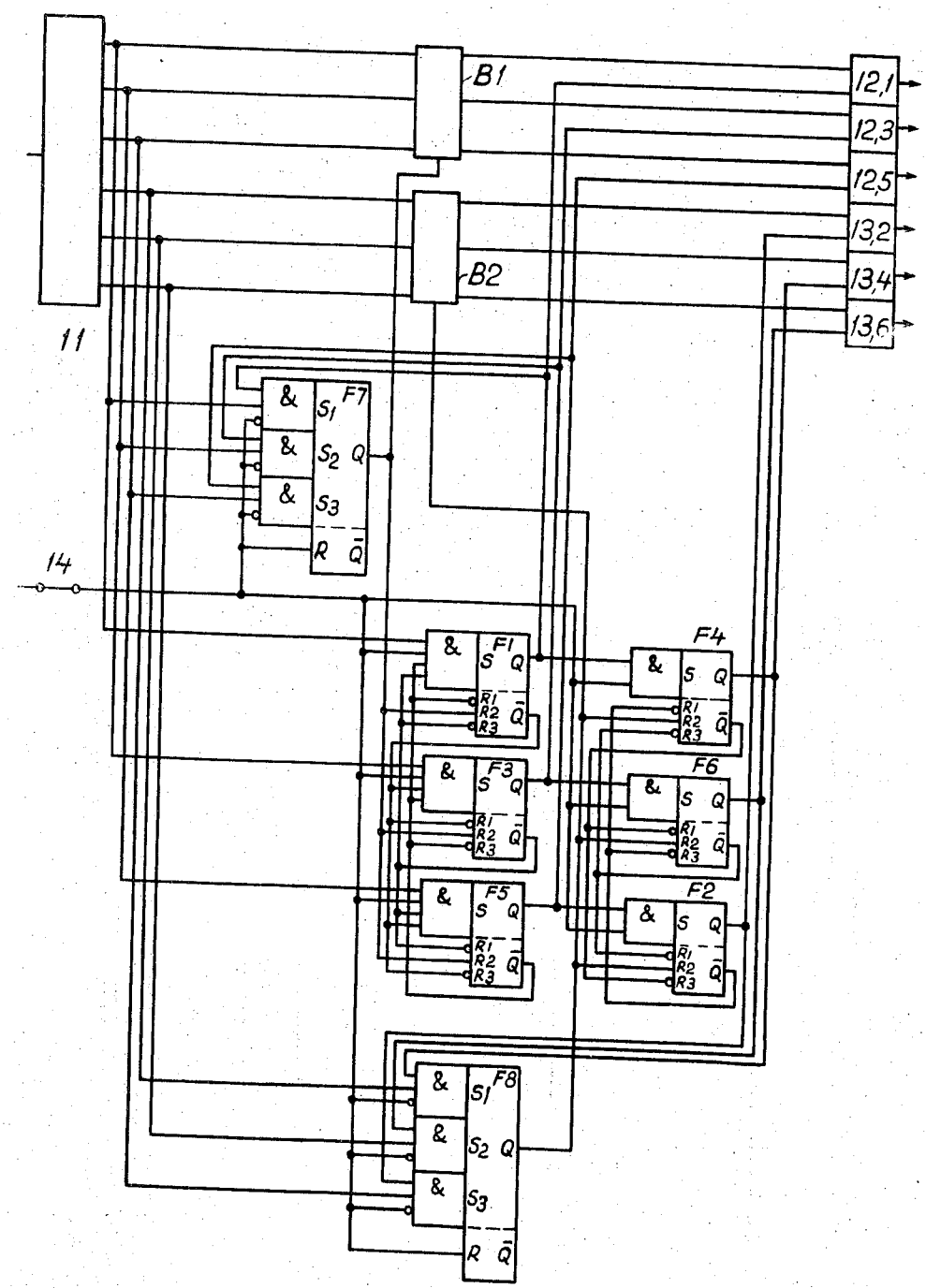
FIG. 3 shows in more detail the control equipment according to the invention.

The rectifiers 1 to 6 are controlled from a control pulse emitter 11 which, in turn, is controlled by a control angle emitter (not shown) comprising the control equipment for the converter which determines the control angle in a known manner, that is, the phase position for the control pulses from 11 with respect to the commutation voltage. The control equipment in FIG. 1 is shown, for the sake of clearness, as one-phase for each of the two commutation groups in the rectifier bridge. In this way, the control pulse generator has two outputs which are connected to the rectifiers 1 to 6 by way of connection members B1 and B2 and Or-gates 12,13. The three-phase design of the control equipment is shown in FIG. 3.

The connection members B1 and B2 are controlled by control circuits in the form of bistable flip-flops F7 and F8 having outputs for connection and disconnection of B1 and B2 and the input for connection in the form of an And-gate influenced, among other things, by the control pulses for the corresponding commutation group. Disconnection of the flip-flops F7 and F8 and thus of the connection members B1 and B2 is effected by means of a blocking signal which is indicated here quite symbolically by switching in a contact 14. In practice the blocking signal emanates from safety equipment (not shown) for the convertor.

When the convertor is blocked, two rectifiers belonging to the same phase in the bridge must be selected as a by-pass path, which is done by means of two three-phase flip-flop connections F1, 3, 5 and F2, 4, 6, the former one being superior to the latter one. The flip-flop connection F1, 3, 5 is controlled not only by the blocking signal, but also by the control pulses for the rectifiers 1, 3, 5, so that, in case of blocking, that phase is selected as the by-pass path in which the corresponding rectifier 1, 3 or 5 is conducting when the blocking signal is switched in. The output signal from F1, 3, 5 is transmitted, on the one hand, to the Or-gate 12 for controlling the proper rectifier 1, 3 or 5, the ordinary control pulse of which through B1 has been disconnected, and on the other hand to the corresponding phase 4, 6, 2, in the flip-flop connection F2, 4, 6, and from there a control pulse is delivered to the Or-gate 13.

The outputs from F1, 3, 5 and F2, 4, 6 are further connected to the flip-flop F7 and F8 so that, during blocking, these flip-flops have an indication as to which two rectifiers form the by-pass path, and in the subsequent deblocking F7 and F8 are able to deblock one commutation group 1, 3, 5 and 2, 4, 6, respectively, in synchronism with the ordinary control pulses of these groups.

The blocking and deblocking which are explained in more detail in connection with FIG. 3, will be performed as indicated in the pulse diagram in FIG. 2.

Figure 2:
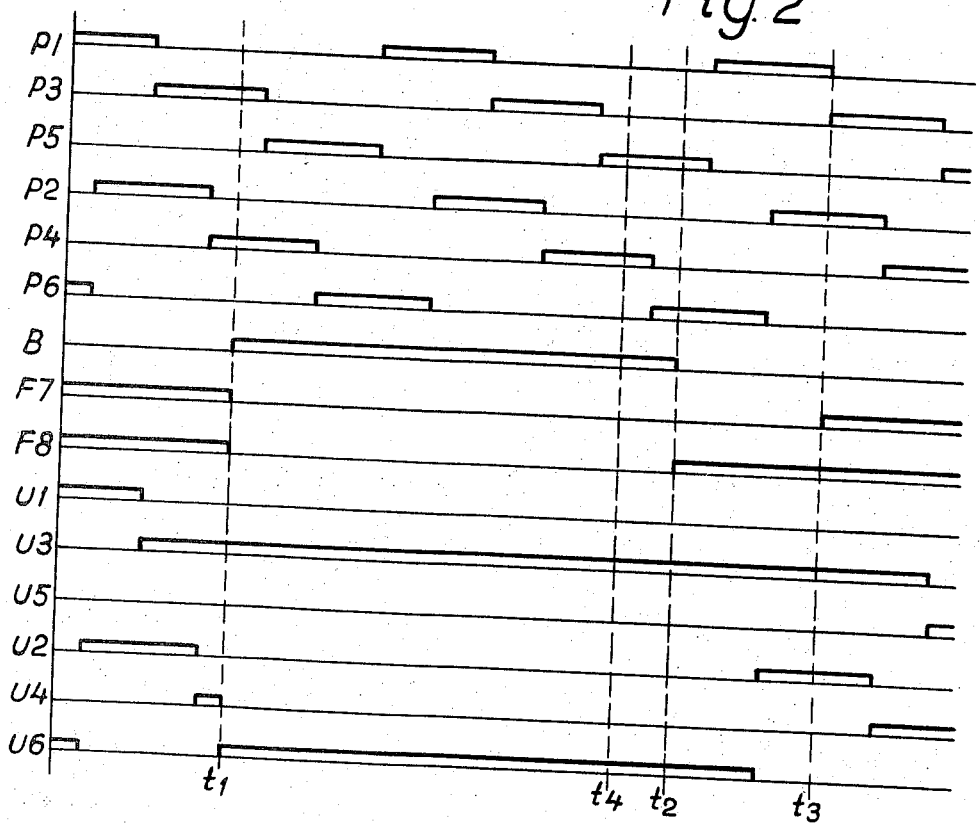
FIG. 2 shows control pulses for the rectifiers of the convertor and for blocking and deblocking of the convertor.

The first six rows in FIG. 2 show the 120° long control pulses p1 to p6 from the control pulse generator 11. In this way, these pulses mark the conducting intervals for the rectifiers 1 to 6, and the long pulses are often converted on their way to the rectifiers, that is, after passing the Or-gate 12, 13, into short pulses, which however, does not concern the present application.

The seventh row in FIG. 2 marks the blocking signal B and the next two rows the output signals from F7 and F8 to, among other things, the connection members B1 and B2. The last six rows indicate the output signals u1 to u6 to the rectifiers 1 to 6 from the Or-gates 12,13 both during normal operation and in the case of blocking and deblocking.

During normal operation up to the time $t_1$, see FIG. 2, the flip-flops F7 and F8, see FIG. 3, are in on-position, marked Q, whereas the flip-flops F1 to F6 are in off-position, marked $\bar{Q}$. The connection members B1 and B2 are conducting and let through the control pulses p1 to p6 to the upper inputs on the Or-gates 12,13 and further to the rectifiers. Two rectifiers, one from each commutation group, are always conducting. The flip-flops F1 to F6 each correspond to one rectifier 1 to 6. F7 and F8 are provided with three-phase inputs on the on-side in the form of And-gates, the output signals S1 to S3 of which are supplied to the flip-flop in the Or-connection. The two groups of flip-flops F1, 3, 5 and F2, 4, 6 are each provided with mutual blocking over their off-outputs $\bar{Q}$, so that the flip-flop which is in on-position Q blocks the other two in their off-position $\bar{Q}$ by way of the negative off-outputs $R_1$ and $R_3$. The third off-output $R_2$ is influenced by the signal from F7 and F8, respectively. The inputs R1 to R3 are arranged in an Or-connection.

At the time $t_1$, see FIG. 2, the blocking signal B is started, the flip-flops F7 and F8 being disconnected by way of input R so that the control signals to B1 and B2 disappear. In this way, the ordinary control pulses to the rectifiers are interrupted.

By means of the flip-flops F1, 3, 5 the rectifier pair which is to form a by-pass path is selected. This occurs because the control pulse p1, p3 or p5 for the one of the rectifiers 1, 3 or 5 which is conducting at the beginning of the blocking proceeds to the And-gate for the corresponding flip-flop F1, 3, 5, respectively, together with the blocking signal and the off-signals $\bar{Q}$ from the two adjacent flip-flops. In the case according to FIG. 2, F3 will receive an input signal and supplies an output signal Q to the rectifier 3 by way of the Or-gate 12, 3 as well as to the flip-flop F6 which supplies an output signal to the rectifier 6 by way of the Or-gate 13, 6.

By this choice of the by-pass path, one of the current-carrying rectifiers is always included in the path, and therefore the establishing of the by-pass path according to the invention is accomplished almost instantaneously which is of great importance, especially for a rectifier unit. If the choice of by-pass path is made in another way, for example as a rectifier pair selected beforehand, further commutations may occur before this rectifier pair is able to take over the current, which may cause an increased over-current.

It is clear that the flip-flops F1, 3, 5 control the flip-flops F2, 4, 6 and that the same result would be obtained if the roles for these two groups of flip-flops were exchanged. It would be possible to arrange a switching between these two groups of flip-flops so that the dominating one could be chosen freely. By arranging a fault recorder for the different rectifiers or rectifier pairs and by allowing these fault recorders to control said switching, it is possible to avoid the inclusion of a weak rectifier in a by-pass path during blocking.

In the case described above, the outputs from the flip-flops F3 and F6 further influence the And-gates S2 of the flip-flops F7 and F8 which are then prepared for deblocking.

At the time $t_2$ the blocking signal ceases and the flip-flops F7 and F8 are liberated after having been kept blocked by a blocking signal on the input R. Reconnection of F7 and F8 and, accordingly, of B1 and B2 and the corresponding rectifier groups is performed in dependence on the control pulses p1 to p6 from 11. At the time $t_2$ the control pulse p6 for the rectifier 6 which is included in the by-pass path is on, and the flip-flop F8 receives a signal by way of the And-gate S2 and is switched on. This makes the connection member B2 conducting, so that the rectifier group 2, 4, 6 starts normal operation and the flip-flop F6 is switched off. At the time $t_3$ the control pulse p3 occurs and switches on the flip-flop F7 and thus B1, whereas $F_3$ is disconnected. After this normal operation is restored.

If the blocking signal had ceased at the time $t_4$, when none of the control pulses p3 or p6 were on, the deblocking could not have been started until the control pulse p6 had started normally. This is however rather insignificant.

In the example shown the blocking time is rather short-lived, only a little more than one period. In practice, however, it is normally longer also during the shortest time of reconnection. Normally, however, the control pulse generator continues its work during the blocking time so that a synchronized deblocking according to the above description can be carried out.

When the blocking is performed for a longer period of time, the isolator 10 is closed, but the control pulses p1 to p6 and the blocking signal B suitably remain. In this way, re-ignition of the pair of by-pass rectifiers can be effected as soon as the isolator 10 is opened, possibly according to the method described in Boksjo, application No. 360,539, filed May 15, 1973.

We claim:

1. An electronic power convertor having a plurality of rectifiers (1–6) in multi-phase bridge connection, the rectifiers in each half of the bridge connection forming a commutation group(1, 3, 5 and 2, 4, 6, resp.), a pulse generator (11), the pulse generator producing pulses cyclically for the commutation groups, means connecting the pulse generator to the rectifiers, first connecting members (B1, B2) for each commutation group in said connecting means, control circuits (F7, F8) for said connecting members, means (14) to supply a blocking signal, the control circuits (F7, F8) for the connecting members (B1, B2) including means (R) responsive to the blocking signal to render the connecting members inoperative, in said means connecting the rectifiers (1–6) to the pulse generator (11) second connecting members (F1, 3, 5 and F2, 4, 6) in parallel with said first connecting members (B1, B2), said second connecting members controlled from the control circuits (F7, F8) for said first connecting members responsive to the blocking signal to continue the supply of a control pulse to one of the rectifiers which is conducting when said blocking signal is initiated and to supply a control pulse to the corresponding rectifier in the same phase of the other commutation group, whereby such two rectifiers act as a by-pass path.

2. A convertor as claimed in claim 1, said control circuits (F7, F8) for the first and second connecting members (B1, B2 and F1, 3, 5; F2, 4, 6, resp.) for the rectifiers of one of the commutation groups (1, 3, 5 or 2, 4, 6) each including an And-gate connected to the pulse generator (11) and to the blocking signal supply means (14) to activate the proper connecting member for the rectifier of such group which is conducting, said first connecting members (B1, B2) being activated when a blocking signal is lacking, said second connecting members (F1, 3, 5; F2, 4, 6) being activated in case of a blocking signal.

3. A convertor as claimed in claim 2, said second connecting members (F2, 4, 6) for the rectifiers (2, 4, 6) of the other of the commutation groups being connected to outputs of the respective second connecting members (F1, 3, 5) of the first group (1, 3, 5).

4. An electronic power convertor having a plurality of rectifiers (1–6) in multi-phase bridge connection, the rectifiers in each half of the bridge connection forming a commutation group (1, 3, 5 and 2, 4, 6, resp.), a blocking of the convertor being performed by igniting two rectifiers belonging to one phase of the bridge connection and constituting by-pass rectifiers (1, 4 or 3, 6 or 5, 2, resp.), a control pulse generator (11) having outputs for the different rectifiers, for each commutation group connecting members (B1, B2) for connecting the respective outputs of the control pulse generator to the rectifiers of the group, said connecting members being controlled by control circuits (F7, F8) with a first input (R) influenced by a blocking signal for the convertor for disconnection of the connecting members and with a second input (S1-3) for connection of the connecting members for each commutation group and connected to the proper outputs of the control pulse generator.

* * * * *